United States Patent Office 3,052,517
Patented Sept. 4, 1962

3,052,517
NOVEL PREPARATION OF ALKALI METAL DICYANAMIDES
Richard L. Gilbert, Jr., Old Greenwich, Conn., assignor to American Cyanamid Company, New York, N.Y., a corporation of Maine
No Drawing. Filed Feb. 16, 1961, Ser. No. 89,617
11 Claims. (Cl. 23—78)

The present invention relates to the novel preparation of alkali metal dicyanamides. More particularly, it relates to the preparation of the sodium and potassium salts of dicyanamide in good yield and purity, substantially free from nitrogeneous by-products.

In the past, the water-soluble alkali metal salts of dicyanamides have not been commercially prepared due to their high cost of manufacture. These salts, however, have been prepared directly, for instance, by treating disodium cyanamide with cyanogen bromide and recovering sodium dicyanamide. This method is not wholly acceptable due principally to the formation of the sodium hydroxide which reacts with cyanogen bromide to form soluble sodium cyanate and other nitrogenous impurities. Not only are yields low, but products of good purity cannot be readily had, due to the inherently similar solubility characteristics of the respective resultant soluble salts rendering their separation exceedingly difficult and impractical. To obviate this serious drawback, it has been proposed to prepare alkali metal salts of dicyanamides by the double decomposition reaction of a calcium, zinc or copper salt of dicyanamide and an alkali metal hydroxide or carbonate. Unfortunately, this method is not entirely satisfactory, since such metathetical reactions involve the use of complicated, uneconomical procedures for processing.

Alkali metal dicyanamides are useful intermediates in the preparation of pharmaceuticals, chemotherapeutic agents and dyes. More recently, they have been found to possess outstanding mothproofing properties. Since utility for such alkali metal dicyanamides has been established, it would be desirable to provide a direct and economical procedure for preparing such compounds, if one such procedure could be devised.

It is, therefore, a principal object of the present invention to provide a direct, economical procedure to obtain the alkali metal salts of dicyanamides in good quality and yield. It is a further object to prepare alkali metal dicyanamides directly from free cyanamides utilizing alkali metal hydroxides and cyanogen halides. Other objects will become apparent from a consideration of the following description.

To this end, it has been unexpectedly found that alkali metal dicyanamides can be readily prepared by contacting an aqueous solution of free cyanamide with an alkali metal hydroxide until a pH between 10 and 12 is obtained, and then bubbling into the so-treated solution cyanogen halide while maintaining the pH within the stated range by adding additional alkali metal hydroxide. Cyanogen halide introduction is stopped when stoichiometric amounts of the alkali metal hydroxide have been added. Precipitation of alkali metal dicyanamides is soon observed. The presence of alkali metal cyanates and other nitrogenous impurities, however, is not detected and alkali metal dicyanamide in good yield and purity is recovered.

According to the process of the present invention, the free cyanamide is reacted with a stoichiometrical quantity of an alkali metal hydroxide in the presence of a cyanogen halide. The reaction contemplated herein can be expressed as follows:

$$H_2NCN + 2MOH + CNX \rightarrow MN(CN)_2 + 2H_2O + MX$$

where X is a chloride, bromide, iodide or fluoride radical and M is sodium or potassium.

Though the typical reaction as expressed above appears to be relatively simple, unexpectedly the desired products in good yield and purity are not obtained unless critically controlled reaction conditions are observed. If they are not, the formation of alkali metal cyanates is noted. This results in substantially reduced yields of desired product. The critical conditions are:

(1) The alkalinity of the solution during reaction should be maintained at a pH between about 10 and 12, and
(2) The cyanogen halide should be introduced at a rate sufficient to allow the stated pH to remain substantially constant.

When during the reaction a drop in pH below 10 is observed, additional alkali metal hydroxide not to exceed about two mols of alkali metal hydroxide per mol of cyanamide reactant is concurrently added to restore the pH to its original level. Thus, the requisite stoichiometric amount of alkali metal hydroxide is supplied and the slurried reaction mixture cooled to between about 0° C. and 10° C. to precipitate out desired dicyanamide salt. The latter is next separated by filtration, leaving behind in the solution principally alkali metal chlorides. Dicyanamide alkali metal salts are obtained in good yield and purity and the impurity is further improved by washing the so-filtered dicyanamide salts with a polar solvent such as acetone and then oven-drying the latter.

It is an advantage of the present invention that a broad range of temperatures is contemplated to initiate and complete the reaction. Thus, temperatures within the range of 0° C. and 30° C. may be herein employed. However, for convenience of operation, temperatures within the range of 15° C. and 30° C. are preferred.

In general, free cyanamide is reacted with an alkali metal hydroxide. Illustrative of the latter are: sodium hydroxide and potassium hydroxide, although sodium hydroxide is preferred. It has been found that the use of lithium hydroxide has not led to satisfactory results, since the resultant lithium dicyanamide salt per se is found to be unduly soluble at the separation temperature level of about 0° C. and 10° C. and, therefore, does not lend itself to ready separation from admixed lithium halide impurity.

The cyanogen halide contemplated includes, as indicated above, cyanogen fluoride, cyanogen chloride, cyanogen bromide and cyanogen iodide. Of these, cyanogen chloride is preferred because of its availability and ease of reaction.

Recovery of the desired alkali metal salt in the resultant reaction slurry usually occurs at between 0° C. and 10° C. and usually at about 5° C. Operating within these temperatures insures the ready separation of desired dicyanamide salt as a solid filter cake. The reaction solution or mother liquor is discarded. Recovered solids, however, are next subjected to washing to remove occluded mother liquor containing dissolved impurities. A selective polar solvent, such as acetone or alcohol, is employed as the wash liquor to displace the occluded mother liquor to the exclusion of the desired dicyanamide salt. The latter salt is next dried at elevated temperatures within the range of between 60° C. and 100° C. A good yield of the desired dicyanamide salt substantially free from nitrogenous by-product is obtained.

The following examples will illustrate the preferred embodiments of the invention and are not to be taken as limitative thereof. Unless otherwise stated, the parts are by weight.

*Example 1*

In a suitable reaction vessel containing a solution of 367 parts of free cyanamide in 1330 parts of water is added a solution of 134 parts of sodium hydroxide in 134 parts of water, while maintaining a temperature of about 18° C. The pH of the resultant solution is 10. To the so-treated cyanamide solution are next added, concurrently, over a period of about one and one-half hours, 628 parts of cyanogen chloride and 557 parts of sodium hydroxide dissolved in 557 parts of water in a manner such that the temperature is maintained at about 18° C. and the pH controlled within the range of from about 10.5 to 11.5. Resultant slurry is cooled to 5° C. and filtered.

Recovered filtered crude sodium dicyanamide cake is then washed with 1350 parts of 98% acetone, which has been cooled to 0° C. The solid washed cake is next dried at 60° C. Six hundred and sixty-seven parts of crude sodium dicyanamide substantially free from nitrogenous by-products are obtained in a purity of 80%, the major impurity being sodium chloride. The yield, based on free cyanamide charged, is 70%.

*Example 2*

The procedure of Example 1 is repeated in every detail except that equivalent amounts of potassium hydroxide and cyanogen bromide in place of sodium hydroxide and cyanogen chloride are employed. The yield and purity of recovered potassium dicyanamide are similar to those obtained in Example 1 above.

It is an advantage of the present invention that a direct process for preparing the sodium and potassium salts of dicyanamide has been provided. Thus, such salts are elevated from the status of laboratory curiosity to that of a valuable industrial chemical substantially free from nitrogenous by-products. As such, they find particular utility as an intermediate in pharmaceutical preparations.

I claim:

1. In a process for preparing an alkali metal salt of dicyanamide by reacting free cyanamide with an alkali metal hydroxide in the presence of cyanogen halide, the improvement which comprises the steps of: introducing at a temperature between about 0° C. and 30° C. an aqueous solution of free cyanamide and an alkali selected from the group consisting of sodium hydroxide and potassium hydroxide until a pH within the range between 10 and 12 is obtained, incorporating therein a cyanogen halide gas while maintaining the said pH and temperature ranges, terminating the cyanogen halide addition at the point a stoichiometric amount of said alkali metal hydroxide has been added, said stoichiometric amount being equal to about two mols of alkali metal hydroxide per each mol of free cyanamide and cyanogen halide, and recovering thus-formed alkali metal dicyanamide in good yield and purity substantially free from nitrogenous by-products.

2. The process according to claim 1, in which the cyanogen halide is cyanogen chloride.

3. The process according to claim 1, in which the cyanogen halide is cyanogen bromide.

4. The process according to claim 1, in which the alkali metal hydroxide is sodium hydroxide.

5. The process according to claim 1, in which the alkali metal hydroxide is potassium hydroxide.

6. In a process for preparing an alkali metal salt of dicyanamide by reacting free cyanamide with an alkali metal hydroxide in the presence of cyanogen halide, the improvement which comprises the steps of: adding to an aqueous solution of free cyanamide at temperatures between about 15° C. and about 30° C. an alkali selected from the class consisting of sodium hydroxide and potassium hydroxide until a pH within the range between 10 and 12 is obtained, introducing therein cyanogen halide gas and additional alkali metal hydroxide concurrently while maintaining the said pH and temperature ranges substantially constant, terminating the cyanogen halide and alkali hydroxide additions at the moment when a stoichiometric amount of said alkali metal hydroxide is added, said stoichiometric amount being equal to about two mols of alkali metal hydroxide per each mol of free cyanamide and cyanogen halide, then reducing the temperature of the resultant mixture to between 0° C. and 10° C. to obtain an aqueous slurry, filtering said slurry to recover a filter cake comprising alkali metal dicyanamide and occluded mother liquor, washing the resultant filter cake to displace the said mother liquor therein, drying and recovering the so-formed alkali metal dicyanamide as a solid in good yield and purity substantially free from nitrogenous impurities.

7. The process according to claim 6, wherein said filter cake is washed with acetone and dried at temperatures between about 60° C. and 100° C.

8. The process according to claim 6, in which the cyanogen halide is cyanogen chloride.

9. The process according to claim 6, in which the cyanogen halide is cyanogen bromide.

10. The process according to claim 6, in which the alkali metal hydroxide is sodium hydroxide.

11. The process according to claim 6, in which the alkali metal hydroxide is potassium hydroxide.

References Cited in the file of this patent

FOREIGN PATENTS 571,340    Great Britain _____ Aug. 21, 1945

OTHER REFERENCES

"J. Appl. Chem." 6, March 1956, page 92.
"Ind. and Eng. Chem." vol. 41, No. 12, December 1949, pages 2840–41.